UNITED STATES PATENT OFFICE.

SADAKICHI SATOW, OF SENDAI, JAPAN.

PROCESS OF MAKING CELLULOID-LIKE SUBSTANCES.

1,245,983.                    Specification of Letters Patent.        Patented Nov. 6, 1917.

No Drawing. Original application filed December 11, 1916, Serial No. 136,296. Divided and this application filed April 12, 1917. Serial No. 161,491.

*To all whom it may concern:*

Be it known that I, SADAKICHI SATOW, a subject of the Emperor of Japan, residing at Sendai, Japan, have made a certain new and useful Invention in Processes of Making Celluloid-like Substances, (Case S,) of which the following is a specification.

This invention relates to the process of making condensation products of vegetable proteids, and embraces the subject-matter divided from my application, Serial No. 136,296, filed Dec. 11, 1916.

The object of the invention is to produce a celluloid-like substance capable of being utilized in the manufacture of various commercial products, having any desired degree of flexibility, elasticity, hardness, and transparency, in an economical and efficient manner.

In carrying out my invention I employ, either in the form of a dry powder or of wet cakes, or otherwise, vegetable proteids or proteidal substances, such as are obtained from suitable vegetable proteid-containing material, such as beans, peas, wheat, corn, or other leguminous, cereal or grain products.

The proteid containing raw material is crushed to break down the cellular structure thereof, and if it contains an undesirable percentage of oil, the oil content is removed. This may be effected in any suitable manner, as, for example, by treating the mass with an oil solvent, such as benzin. The oil solvent is then removed from the mass in any desired manner. The proteidal substances contained in the "meal" or "proteid meal" thus produced, are separated therefrom to produce a refined proteid product. This separation of the proteidal substances from the proteid meal may be effected in various ways. According to one method the "meal" is treated with an alkaline solution such as a dilute solution of caustic or carbonated alkali, or caustic or carbonated ammonia, or other compound which reacts alkaline in aqueous solution such as sodium sulfite, borax sodium phosphat or the like and the proteidal substances, either with or without further purification of the resulting liquid, are precipitated therefrom. The further purification referred to may be accomplished by filtration, centrifuging, or the like, by fractional precipitation, fractional dissolution of precipitated impure proteids, or by converting one or more components into other chemical compounds having different properties which enable their separation to be effected, or one or more of these various purifying methods may be employed in combination with one or more of the others. The precipitation of the refined proteidal substances is accomplished by adding a suitable acid such as sulfuric, sulfurous, acetic, or phosphoric acid, or by adding a suitable ferment such as lactic or acetic ferment. The precipitate is separated from the mother liquor and, if desired, may be pressed into cakes or dried under vacuum or otherwise.

According to another method the meal is treated with water and the proteidal products, which thereby are carried into the liquid as suspensoids are precipitated either with or without purification of the liquid in the manner above described, the precipitation being effected with an acid or a ferment and the precipitate separated as above pointed out.

According to still another method the meal is treated with an aqueous salt solution, such as sodium chlorid, ammonium sulfate, or the like, and the resulting liquid, either with or without further purification in the manner above explained, is subjected to dialysis and the precipitate collected and treated as above described.

The proteids or proteidal substances, obtained as above described, whether in refined state or not, are kneaded with a material which reacts with formaldehyde to produce an oxymethane compound, for example a mixed solution of concentrated sulfurous acid and formaldehyde. When these substances are mixed together oxymethanesulfonic acid is produced, thus

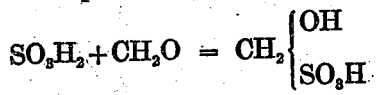

The sulfurous acid may be replaced with sodium sulfite which reacts with the formaldehyde to produce sodium oxymethanesulfonate. The oxymethanesulfonic compound acts upon the proteid as a glutinizing agent and also as a condensing agent. The thoroughly kneaded mass is then molded and dried.

In effecting its glutinizing action upon the porteids or proteidal substances, the oxymethanesulfonic compound glutinizes the proteids into their soluble derivatives, thereby producing a transparent and colorless or nearly colorless plastic, viscid, and sticky mass which can be readily molded into any desired form. The molded article is then dried, and during the drying operation condensing action takes place thereby serving to harden the mass.

If desired, and for certain uses of the product, suitable viscous plastic material such as hydrocellulose, oxycellulose or cellulose esters, which substances I will call herein cellulose derivatives, or other viscous substances, such as triphenyl-phosphate, or glycerin, as well as suitable organic or inorganic filling material, such as cotton or other fibrous material, and a suitable pigment or other coloring matter, may, at any convenient or desired stage be incorporated into the mass.

I have found that the proportion of one hundred pounds of the proteids or proteidal substances, for example gliadin, in the form of wet cakes, to one gallon of a mixed solution of concentrated sulfurous acid and formalin with which it is kneaded, is an efficient proportion which may be observed in carrying out my invention. It is to be understood, however, that these proportions are merely illustrative. By varying the relative amounts of the components employed the degree of flexibility, elasticity, plasticity, tenacity and transparency of the resulting product is controlled.

Having now set forth the object and nature of my invention and the method of carrying the same into practical operation, what I claim as new and useful, and of my own invention, and desire to secure by Letters Patent is:—

1. In the manufacture of celluloid-like substances, the process which consists in treating vegetable proteids with an oxymethane-sulfonic compound.

2. In the manufacture of celluloid-like substances, the process which consists in treating vegetable proteids with a mixture of formaldehyde and an agent which reacts therewith to produce an oxymethane-sulfonic compound.

3. In the manufacture of celluloid-like substances, the process which consists in treating vegetable proteids with a mixture of sulfurous acid and formaldehyde.

4. The process which consists in extracting with sodium sulfite the soluble contents of vegetable proteid containing material and then separating the vegetable proteids from the solution, and finally glutinizing and condensing the separated proteids.

5. The process which consists in extracting with sodium sulfite the soluble contents of vegetable proteid containing material, and then separating the vegetable proteids from the solution and finally treating the separated proteids with an oxymethane-sulfonic compound.

6. The process which consists in extracting with sodium sulfite the soluble contents of vegetable proteid containing material and then separating the vegetable proteids from the solution and glutinizing the separated proteids.

In testimony whereof I have hereunto set my hand on this 9th day of April A. D., 1917.

SADAKICHI SATOW.